Figure 1:
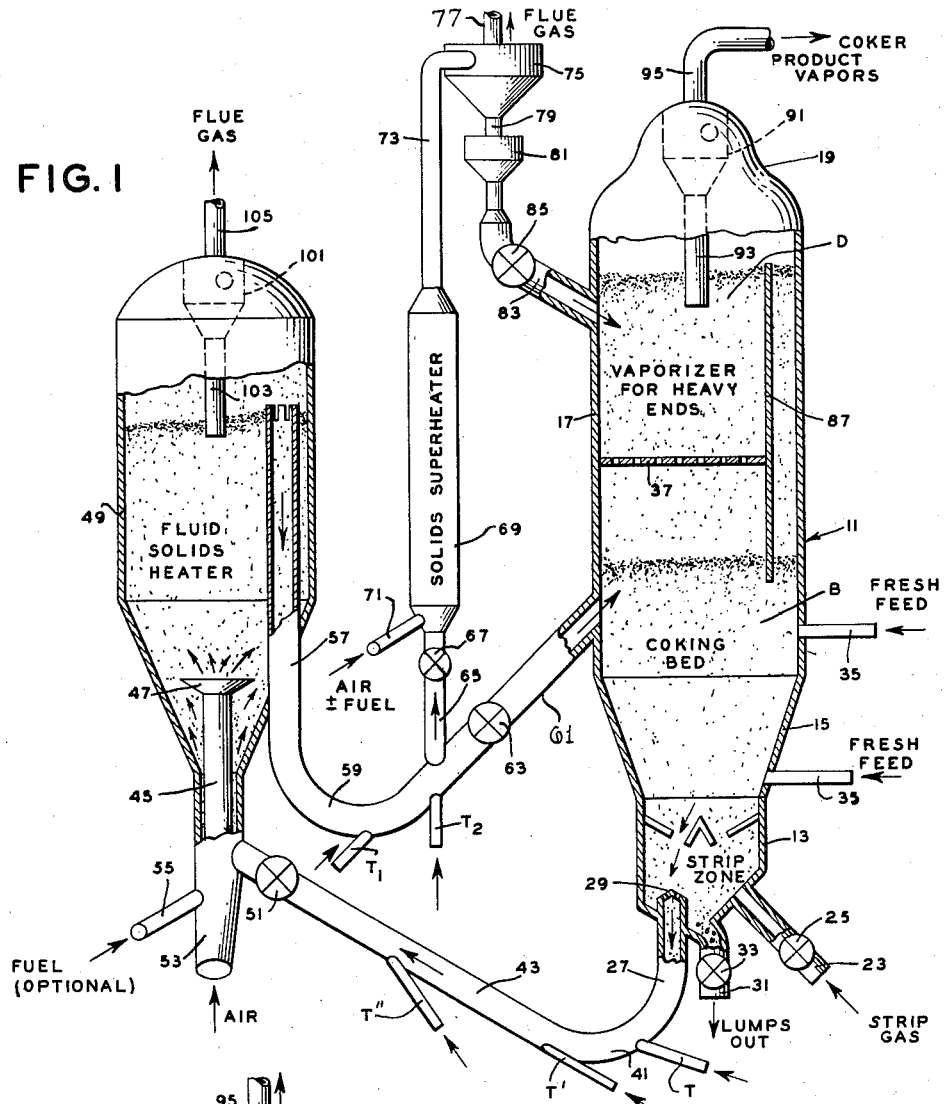

Dec. 2, 1958        L. B. SMITH        2,862,871

FLUID COKING PROCESS AND APPARATUS

Filed Oct. 30, 1953

INVENTOR
LLOYD B. SMITH

BY
ATTORNEY

United States Patent Office 2,862,871
Patented Dec. 2, 1958

2,862,871

FLUID COKING PROCESS AND APPARATUS

Lloyd B. Smith, Baton Rouge, La., assignor to Esso Research and Engineering Company, a corporation of Delaware Application October 30, 1953, Serial No. 389,298

6 Claims. (Cl. 208—53)

The present invention relates to an improved fluid coking process and apparatus, adapted especially for the conversion of heavy hydrocarbon oils to more volatile and more valuable products. The invention is particularly applicable to the conversion of heavy residual petroleum oils, especially those of high boiling range. It is applicable also, however, to shale oils, pitches and other viscous hydrocarbons capable of being cracked thermally.

It has previously been proposed to convert heavy oils such as reduced crudes to gasoline, gas oil, etc., by contacting such oils, in liquid phase, with fluidized masses of hot catalytically inert solid particles. The use of a fluid bed of preheated solid particles is an efficient method for transferring heat and obtaining intimate contact between solid particles and gaseous, vaporous or liquid hydrocarbons. Thus in a preheated bed of finely divided preheated particles, such as coke, sand, pumice, carborundum, metal shot, ceramic beads, etc., of particle size between about 20 and 400 microns' average particle diameter rapid conversion of the oil takes place, with some degradation to coke. The solid particles are usually preheated to a temperature within the range of about 900° to 1200° F. They may be fluidized by passing an unreactive gas such as steam upwardly through them, with suitable dispersion to accomplish fluidization as is well known in the art.

The oil to be converted is preferably preheated but not up to its cracking temperature. Preheating to a temperature between 300° and about 750° F. is usually preferred. The preheated oil is sprayed or otherwise dispersed as uniformly as practicable throughout the bed. Some of the oil may be in vapor phase but a large part of it, as a rule, is in liquid phase and it contacts and coats the solid particles with a wet oil film. The hot particles partially vaporize and partially crack the oil film, with the result that oil vapors are evolved and coke or a carbonaceous residue is deposited upon the particles. The process is endothermic and the particles are cooled. Periodically they must be reheated and this is usually accomplished by withdrawing them from the reaction zone to a heating zone. In the latter, a combustion supporting gas such as air or oxygen contacts the particles and reheats them by burning off a portion of the carbonaceous deposits or, alternatively, a combustible fuel such as gas, torch oil, etc., is fed along with the air or oxygen to supply the heat.

The process above described is effective and reasonably efficient. Coke particles produced in the process are the preferred solids although metal particles, refractory mineral particles, etc., may be used instead. In general, the process evolves a considerable quantity of gas and/or vapor which flows upwardly out of the bed of solids to a suitable recovery system. In many cases, however, this stream includes droplets of unconverted feed, or heavy ends of boiling range higher than is desired in the products or in subsequent processing operations. For example, a gas oil rather than a motor fuel is usually desired as the major coker product. Coker gas oil, if of suitable quality, can be cracked catalytically to produce high grade motor gasoline, whereas coker gasoline is often of relatively inferior quality.

However, if the gas oil carried over from the coker contains substantial proportions of heavy uncracked ends, e. g. components boiling above about 1050° F., considerable difficulty may arise. The heavy products themselves form objectionable coke and heavy tar deposits in the product lines and subsequent processing equipment. They are likely to entrain objectionable ash or ash-forming constituents which are potent catalyst poisons and cause rapid inactivation of cracking catalysts.

It has previously been proposed, in an application of Adams et al., Serial No. 183,828, filed September 8, 1950, to pass coking products through a second and hotter coking stage. The present invention, however, involves various improvements and features not disclosed therein.

A primary object of the present invention is to prevent or substantially reduce the carry-over of heavy coker product constituents and thereby improve their quality. This is accomplished, according to the present invention, by passing the coker effluent relatively quickly through one or more superheated beds or layers of superheated solids, i. e. through one or more layers of the same type of solids as used for coking but heated to a substantially higher temperature. The solids from both beds are subsequently combined and reheated, and one stream thereof is superheated to return to the higher temperature beds or layers.

It also has been proposed previously to pass the coker effluent through a cooling bed to cause condensation of heavy end vapors. The present invention, however, is based on the discovery of specific advantages in a system particularly adapted for converting unvaporized liquid particles by passing the whole effluent quickly through a superheated shallow bed or layer. This conversion must be accomplished in such a way as not to degrade the coker products which are in the desired boiling range while upgrading those which are above such boiling range. Fortunately, the characteristics of a shallow fluidized bed of relatively coarse and catalytically inert solids, such as coke particles within the size range of 20 to 400 microns, and especially between 40 and 200 microns average diameter, are highly suitable for the purpose. According to the present invention, if such solids are heated to a temperature such as to establish a bed or layer temperature which is 20 to 200° F. hotter than the coking bed, which is preferably between 900° and 1150° F., the entrained droplets are detained in the shallow bed or layer (or plurality of beds or layers) long enough to crack them. Carbonaceous and ash residues remain in the bed. The vapors, however, pass through so quickly that they are not adversely affected by the treatment.

The hot shallow layer or bed, or a plurality thereof, may be established upon a grid as a fluidized bed, or by means of bubble trays, as is well known in the art. The thickness of such beds or layers should be substantially in inverse relationship to the elevation of their temperature above bed temperature. For example, when the shallow bed temperature is 100° F. above coking bed temperature the thickness of the shallow bed (or shallow beds, combined) should be less than that used when the temperature differential is only 50° F. The contact time in the second bed must be limited so as not to cause objectionable degradation of the coker vapor products.

Another feature of the invention is the means by which the temperature differential in the solids is established. In the present instance all of the solids are heated to the temperature required for the main or primary coking zone. Upon return to the main coking zone, part of the solids are diverted to the second zone, comprising a shallow bed or beds, and are given additional heating above and beyond that given to the solids in the main coking bed. These and other features of the invention will become more clearly apparent with a description of a preferred specific embodiment of the invention. It will be understood, however, that the invention is not limited thereto except as the appended claims and the prior art may require.

Figure 2:
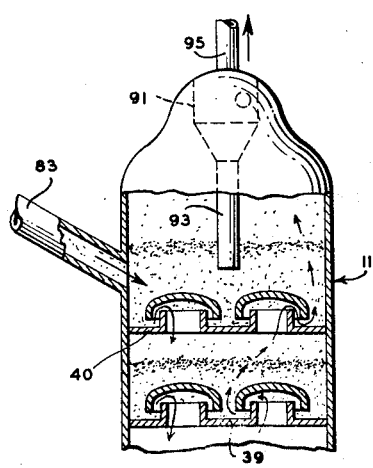

Referring to the attached sheet of drawings, Fig. 1 shows an embodiment of the invention, partly in elevation and partly in section. Fig. 2 shows a preferred modification for the upper part of the coking vessel.

In the system of Fig. 1, a coker vessel 11 is shown, constructed of suitable material for operation at temperatures up to as high as 1150° to 1200° F. This vessel has a lower narrower stripping section 13, a conical or outwardly tapering section 15, a more or less cylindrical section 17, and a top section 19 which encloses a cyclone or like gas-solids separator 21 of conventional type.

A bed B of solid particles, preheated to a sufficient temperature to establish a bed temperature of 900° to 1150° F., is made up of suitable catalytically inert solids such as coke particles of 26 to 400 microns size. This bed, as shown, is established and fluidized in the lower part of vessel 11 by passing upwardly therethrough a stream of gas, such as steam, through an inlet line 23 controlled by a valve 25. This fluidizing gas passes up through stripping section 13 and serves to remove vapors and gases from the coke which flows down into a circulating line 27 through a suitable screening device 29. Lumps or agglomerates too large to pass through the screen 29 are collected in a trap 31 from which they may be removed periodically through a valve 33.

The oil to be converted, preferably preheated above 300° F. but below a thermal cracking temperature (usually not heated to more than 750° F.) is sprayed into the bed through a plurality of nozzles 35. The vapors resulting from contact with the hot solids in this main coking bed add to its mobility and ebullition. These vapors pass upwardly through a transverse grid or perforate plate 37 (in Fig. 1) or through one or more bubble trays 39, 40 (Fig 2), depending upon whether the fluidized bed or the bubble tray system is used for the upper shallow treating bed. The vessel of Fig. 2 is otherwise the same as in Fig. 1.

In contacting and converting the oil sprayed into the main coking bed, the solids thereof become cooled to some degree. At the same time they grow in average particle size by reason of the deposition of additional coke or carbonaceous matter thereon. To reheat them, they are withdrawn through line 27, which constitutes a standpipe, through an angle bend 41 and a laterally ascending conduit section 43 to a riser 45 terminating in a distributor 47 in the bottom part of a heater vessel 49. These parts are conventional in coking systems now well known in the art. Suitable aeration taps, $t$, $t'$, $t''$ may be provided to keep the solids fluid, as is well known in the art. A control valve 51 is provided in line 43 for regulating or cutting off the flow of solids as desired.

An inlet line 53 for air or other oxygen-containing gas to support combustion surrounds the riser 45 and feeds a supply of the gas to contact the solids emerging from distributor 47. In many cases, no auxiliary fuel is needed since the oxygen contacting the hot carbonaceous solids will cause combustion and adequate heat production. However, in some cases it may be preferable not to burn the coke but to withdraw it as a product. In such cases, a fuel such as natural gas, $H_2$, CO, torch oil, etc., or mixtures of any of these may be supplied through a line such as 55.

In heater vessel 49, the solids (coke) are retained long enough to raise their temperature sufficiently to effect the desired coking reaction. They are returned through a standpipe 57 and a bend, such as U-bend 59, to a riser 61, controlled by valve 63, into the upper part of the main coking bed B. Aeration taps $t_1$ and $t_2$ are provided to keep the line fluid.

A branch line 65 from riser 61 is controlled by a valve 67 so as to take off a portion of the solids stream through a superheater 69. This may be a heat exchanger, where a suitable high-temperature heat source is available, e. g. flue gases, but as shown here it is in the form of a transfer line heater. A combustion-supporting gas, such as air, with or without a combustible gas or oil, may be introduced through line 71. The hot solids are accelerated in their travel and pass out of the superheater 69 through outlet line 73 into a gas-solids separator 75. From here, the separated flue gases pass overhead through a line 77. The solids pass down through line 79 into a trap or hopper 81. From the hopper they are passed through a line 83, under control of valve 85, into the upper or shallow bed D. Obviously the pressure in line 83 must be greater than that in zone D so that vapors will not flow up line 83. A partition or weir 87 is provided to control the height of this bed D by overflow. The overflowing solids, cooled somewhat by contact with the upflowing coker vapors, pass into the main coking bed B.

The coker products pass out of the coker through a gas-solids separator 91, the entrained solids returning through line 93 and the vapors passing out through line 95 to a product recovery system, not shown.

A gas-solids separator 101 is included also in burner vessel 49, with its conventional solids return line 103 and flue gas outlet 105.

As indicated above, one or more bubble trays 39, 40 of Fig. 2 may be substituted for the fluid bed supporting grid 37 of Fig. 1. Otherwise the structure represented in Figs. 1 and 2 are identical.

Other changes and variations will readily suggest themselves to those skilled in the art. The fluidizing rate may vary from 0.5 to 5 ft. per second, superficial velocity, through the main coker bed and similarly in the burner. A somewhat higher rate, up to 7 ft. per second, may be permitted in the shallow bed, consistent with the capacity or ability of the gas-solids separator to remove entrained solids from the overhead stream.

What is claimed is:

1. The process of coking heavy hydrocarbon oils which comprises preheating a mass of solid particles of a size between about 20 and 400 microns to a temperature sufficient to establish a main zone coking temperature between about 900° and 1150° F. and fluidizing said mass in said main coking zone, superheating a further mass of said particles having substantially the same particle size distribution and character as said first mass, establishing a secondary coking zone having a temperature 20° to 200° F. higher than said first zone, said secondary zone being in the form of a shallow bed of fluidized superheated particles contacting said oil in liquid phase first with said main zone coking mass to produce vapor products which pass overhead carrying entrained liquid and coke, and passing said vapor products with entrained liquid rapidly through said second zone comprising said shallow bed of said superheated solids to adsorb and crack the entrained liquid whereby the time of contact in the shallow bed is sufficient substantially to absorb the entrained liquid but insufficient substantially to alter the vapor products.

2. Process according to claim 1 wherein the superheated solids are supported in a plurality of bubble trays in the second zone.

3. Process according to claim 1 wherein the superheated solids are fluidized on a perforate supporting grid in the second zone.

4. Process according to claim 1 wherein the solids are coke particles produced in the process.

5. Apparatus for converting heavy oils to more volatile products and coke, comprising a coking vessel, means for fluidizing a mass of finely divided solid particles in the lower part of said vessel to form a main coking bed, means for feeding said oil in liquid phase to said bed, means for supporting a second and shallow bed of said particles above said main bed, a heater for heating said particles to coking temperature, a separate auxiliary heater in series with said first mentioned heater for superheating a portion of said heated particles, means for conveying said superheated particles directly to said shallow bed, means for conveying the remainder of said heated but not superheated particles directly to said main bed, and means for recirculating all said solids to the heater.

6. Apparatus according to claim 5 wherein an overflow weir is provided in the second bed for passing solids therein to the main bed.

References Cited in the file of this patent

UNITED STATES PATENTS

| | | |
|---|---|---|
| 2,436,486 | Scheineman | Feb. 24, 1948 |
| 2,444,990 | Hemminger | July 13, 1948 |
| 2,485,315 | Rex et al. | Oct. 18, 1949 |
| 2,543,884 | Weikart | Mar. 6, 1951 |
| 2,655,464 | Brown et al. | Oct. 13, 1953 |
| 2,655,465 | Martin | Oct. 13, 1953 |
| 2,763,601 | Martin et al. | Sept. 18, 1956 |